US009288716B2

(12) United States Patent
Austin et al.

(10) Patent No.: US 9,288,716 B2
(45) Date of Patent: Mar. 15, 2016

(54) RESOURCE MANAGEMENT IN A WIRELESS COMMUNICATIONS NETWORK

(71) Applicant: AT&T Mobility II LLC, Atlanta, GA (US)

(72) Inventors: Mark Austin, Roswell, GA (US); Kurt Huber, Kennesaw, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 5 days.

(21) Appl. No.: 13/691,495

(22) Filed: Nov. 30, 2012

(65) Prior Publication Data

US 2014/0155080 A1 Jun. 5, 2014

(51) Int. Cl.
*H04W 72/04* (2009.01)
*H04W 28/08* (2009.01)
*H04W 36/22* (2009.01)
*H04L 12/803* (2013.01)

(52) U.S. Cl.
CPC ............. *H04W 28/08* (2013.01); *H04L 47/125* (2013.01); *H04W 36/22* (2013.01)

(58) Field of Classification Search
CPC .. H04W 16/62; H04W 36/222; H04W 72/048
USPC .................... 455/453, 436, 442; 370/252, 334
See application file for complete search history.

(56) References Cited

U.S. PATENT DOCUMENTS

| | | | |
|---|---|---|---|
| 5,796,722 A * | 8/1998 | Kotzin et al. | 370/252 |
| 6,314,301 B1 * | 11/2001 | Dorenbosch et al. | 455/519 |
| 6,477,143 B1 | 11/2002 | Ginossar | |
| 6,826,620 B1 | 11/2004 | Davis et al. | |
| 7,120,467 B2 | 10/2006 | Umesh et al. | |
| 7,813,329 B2 | 10/2010 | Mori et al. | |
| 7,941,148 B2 | 5/2011 | Roskowski et al. | |
| 8,014,362 B2 | 9/2011 | Panico et al. | |
| 8,161,182 B1 | 4/2012 | Cheng et al. | |
| 8,406,146 B2 | 3/2013 | Quilty et al. | |
| 2003/0218974 A1 | 11/2003 | Zuniga | |
| 2006/0128394 A1 * | 6/2006 | Turina et al. | 455/453 |
| 2008/0039089 A1 * | 2/2008 | Berkman et al. | 455/436 |
| 2008/0039141 A1 | 2/2008 | Claussen et al. | |
| 2008/0181291 A1 | 7/2008 | Zhou et al. | |
| 2008/0239953 A1 | 10/2008 | Bai et al. | |
| 2009/0034453 A1 | 2/2009 | Motegi et al. | |
| 2009/0047956 A1 | 2/2009 | Moe et al. | |

(Continued)

OTHER PUBLICATIONS

Notice of Allowance dated Jan. 16, 2014 for U.S. Appl. No. 13/557,960, 21 pages.

(Continued)

*Primary Examiner* — William Nealon
(74) *Attorney, Agent, or Firm* — Amin, Turocy & Watson, LLP

(57) ABSTRACT

Detection of an unbalanced network load and redistribution of network traffic to balance the network load is provided herein. Load balancing across different radios in the same sector of a cell site can be facilitated through detection of the unbalance network load and changes to one or more parameters can be made to rebalance the network load. After radios within a sector are more evenly balanced, network load balancing across sectors can be facilitated. The balancing can be performed to improve system performance, reduce a dropped call rate, as well as to achieve other benefits that can provide an improved user experience as compared to systems that do not attempt to balance the network load.

20 Claims, 11 Drawing Sheets

(56) References Cited

U.S. PATENT DOCUMENTS

| | | |
|---|---|---|
| 2009/0124262 A1 | 5/2009 | Vela et al. |
| 2009/0129448 A1 | 5/2009 | Koslov et al. |
| 2009/0163223 A1* | 6/2009 | Casey .......................... 455/453 |
| 2009/0186627 A1* | 7/2009 | Zhang ......................... 455/453 |
| 2010/0088410 A1* | 4/2010 | Ridley ......................... 709/224 |
| 2010/0232390 A1* | 9/2010 | Varma et al. ................. 370/331 |
| 2010/0254354 A1 | 10/2010 | Sutivong et al. |
| 2011/0130144 A1 | 6/2011 | Schein et al. |
| 2011/0176424 A1* | 7/2011 | Yang et al. ................ 370/236.2 |
| 2011/0182224 A1 | 7/2011 | Ishii |
| 2011/0228687 A1 | 9/2011 | Catovic et al. |
| 2011/0292821 A1 | 12/2011 | Chin et al. |
| 2012/0044908 A1 | 2/2012 | Spinelli et al. |
| 2012/0236717 A1 | 9/2012 | Saska et al. |
| 2013/0077482 A1* | 3/2013 | Krishna et al. ............... 370/230 |
| 2013/0130691 A1 | 5/2013 | Zhu et al. |
| 2013/0337814 A1 | 12/2013 | Wong et al. |

OTHER PUBLICATIONS

Office Action dated Jul. 23, 2014 for U.S. Appl. No. 14/035,751, 22 pages.
Office Action dated Apr. 21, 2014 for U.S. Appl. No. 13/686,868, 25 pages.
Notice of Allowance dated Sep. 12, 2014 for U.S. Appl. No. 14/253,768, 29 pages.
Final Office Action dated Nov. 21, 2014 for U.S. Appl. No. 14/035,751, 27 pages.
Office Action dated Jul. 7, 2015 for U.S. Appl. No. 14/719,957, 23 pages.

\* cited by examiner

RESOURCE MANAGEMENT IN A WIRELESS COMMUNICATIONS NETWORK

TECHNICAL FIELD

The subject disclosure relates to wireless communications and, also generally, to the management of resources in a wireless communications network.

BACKGROUND

The wide adoption of mobile devices along with ubiquitous cellular data coverage has resulted in an explosive growth of mobile applications that expect always-accessible wireless networking. This explosion has placed strains on resources that are scarce in the mobile world. On the user side, dropped calls and poor communication have been blamed for user dissatisfaction. On the network side, instances of dropped calls and poor communication can occur due to improperly managed resources, which could occur during normal usage and/or during periods of heavy usage.

BRIEF DESCRIPTION OF THE DRAWINGS

Various non-limiting embodiments are further described with reference to the accompanying drawings in which.

DETAILED DESCRIPTION

Figure 1:
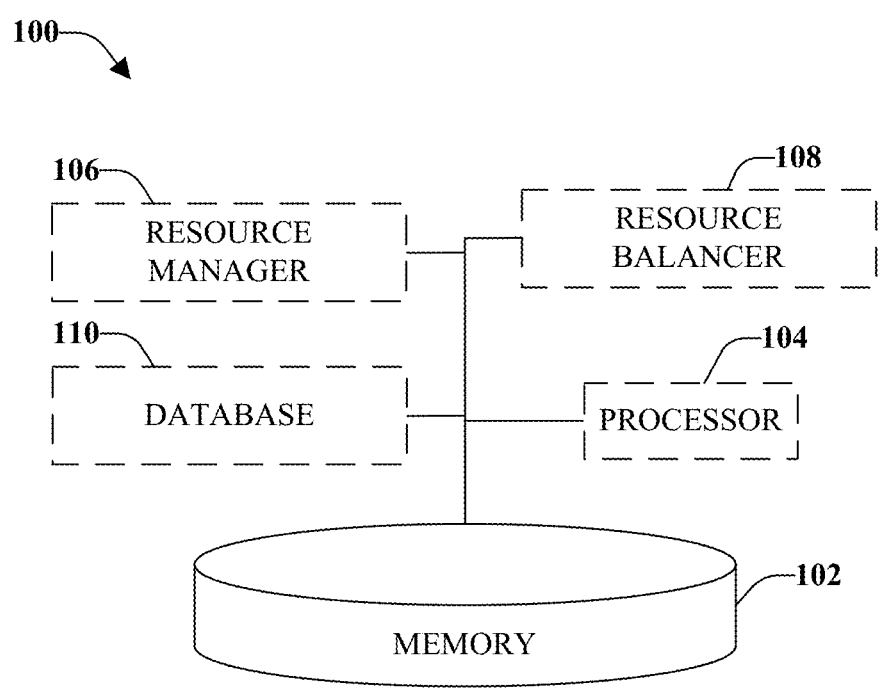
FIG. 1 illustrates an example, non-limiting system configured to manage resources in a wireless communications network, according to an aspect.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The disclosed aspects relate to managing resources (e.g., voice capacity, data capacity, and so forth) in a wireless network, which can be problematic especially due to the exponential growth of voice and data demand. For example, the introduction of advanced mobile devices (e.g., smart phones) and the proliferation of applications that take advantage of the usable bandwidth on a network have increased the amount of data being consumed within a wireless network. It has been estimated that data demand has grown more than five thousand percent within the last few years. Further, it has been observed that as a larger amount of bandwidth is provided, the quicker the available bandwidth is being consumed. For example, as more capacity is added and as more bandwidth hungry applications (e.g., streaming video, streaming music, and so forth) are enabled, the number of users taking advantage of these applications is increasing and a larger amount of data is being consumed. However, capacity expansion is difficult and expensive. Wireless communications systems can be operated with a planned level of congestion (e.g., a projected congestion level) in order to manage the capital investment necessary to provide the increasing amount of needed bandwidth. However, even in the presence of congestion planning, resource management remains important in order to satisfy the network demands.

The disclosed aspects provide for the efficient utilization of network resources (e.g., voice capacity, data capacity, and so forth). In an implementation, the disclosed aspects can be configured to utilize as many resources as possible within the geographic area (e.g., footprint) of the sector(s). Since a network only has a finite amount of spectrum or cell sites available to support the demand, utilization of the spectrum in a cost efficient manner is important and should be implemented regardless of the demands placed on the system during normal usage, during high usage, during near congestion periods, and so on. Spectral efficiency (or bandwidth efficiency) refers to the information rate that can be transmitted over a given bandwidth in a communication system. Spectral efficiency is usually measured in bps/Hz/sector and is a measure of how efficiently the spectrum is utilized by the physical layer protocol and/or the media access control (e.g., channel access protocol).

The link spectral efficiency has an effect on the spectral efficiency of the network. The link spectral efficiency is the net bit rate (or maximum throughput rate) divided by the bandwidth in hertz of a communication channel or a data link. Link spectral efficiency can be measured in bps/Hz. In an attempt to maximize the link spectral efficiency, the transmission technology efficiencies and/or the system spectral efficiency of the system can be changed in accordance with the various aspects. For example, the transmission technology efficiencies can include efficient coding, modulation approaches, and so on. The system spectral efficiency is a measure of the quantity of users and/or services that can be supported at about the same time by a limited radio frequency bandwidth in a defined geographic area and can be measured in bps/Hz/sector or in bps/Hz per unit area. Changing the transmission technology efficiencies and/or the system spectral efficiency can include changing the relative efficiency of the various radios that are deployed on a per sector basis and/or changing how well the various radios are deployed between sites as discussed herein.

For example, in a Universal Mobile Telecommunications System (UMTS), each radio (e.g., carrier) can occupy about 5 MHz of spectrum in the uplink and about 5 MHz of spectrum in the downlink and there can be several radios per sector. Thus, if a network has four carriers per sector, the total capacity used among the four carriers can be optimized in accordance with the disclosed aspects. Further, from a total system point of view, the total capacity of the sector, in conjunction with its other neighboring sectors (e.g., adjacent sectors), can be optimized, according to an aspect. In this regard, for the avoidance of doubt, any embodiments described herein in the context of optimizing resource management are not so limited, and should be considered also to cover any techniques that implement underlying aspects or parts of the described aspects to improve or increase resource management, even if resulting in a sub-optimal variant obtained by relaxing aspects or parts of a given implementation or embodiment.

There are various ways to improve system spectral efficiency by adjusting parameters between carriers (e.g., radios) and between sectors (e.g., sites). The disclosed aspects provide for the evaluation of benefits of various approaches in order to improve capacity, quality, and coverage. Further, adjustments to the system, including movement of network traffic between spectrum allocations (e.g., radios, carriers, and so on) within a sector and/or between sectors (e.g., sites), are provided.

It is noted that although various aspects and embodiments are discussed herein with respect to UMTS, the disclosed aspects are not limited to a UMTS implementation. For example, aspects or features of the disclosed embodiments can be exploited in substantially any wireless communication technology. Such wireless communication technologies can include Universal Mobile Telecommunications System (UMTS), Code Division Multiple Access (CDMA), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Referring initially to FIG. 1, illustrated is an example, non-limiting system 100 configured to manage resources in a wireless communications network, according to an aspect. System 100 can be configured to perform self-configuration such that one or more resources can be balanced across radios located in a sector, according to an aspect. In an implementation, system 100 can be configured to balance the one or more resources across carriers or across different radios in the same sector of a cell site.

For example, a first carrier (e.g., radio) might be handling seventy-five percent of the network traffic on the sector and a second carrier might be handling only twenty-five percent of the network traffic on the sector. Since the first carrier is handling such a large amount of network traffic, the first carrier might have a higher dropped call rate than the second carrier, which can result in an increase in user dissatisfaction. Therefore, system 100 can be configured to balance the network traffic within the sector so that there is not a large discrepancy between the two (or more) carriers. For example, system 100 can balance the network traffic so that there is a close to a fifty/fifty percentage split, a forty/sixty percentage split, and so forth, between the first carrier and second carrier. By balancing the network traffic load more evenly across the carriers, a lower overall dropped call rate can be achieved as well as the reduction of other communication issues that could result in user dissatisfaction.

System 100 can be implemented in a network (e.g., base station, access point, sector, and so forth) or at a higher level within the network. In an implementation, system 100 can be implemented by a third party. As previously noted, although various aspects are discussed herein with reference to UMTS, the aspects are not limited to a UMTS implementation. Instead, the various aspects can be utilized with other network technologies and UMTS technology is utilized herein for purposes of explaining the various aspects.

System 100 can include at least one memory 102 that can store computer executable components and instructions. System 100 can also include at least one processor 104, communicatively coupled to the at least one memory 102. Coupling can include various communications including, but not limited to, direct communications, indirect communications, wired communications, and/or wireless communications. The at least one processor 104 can facilitate execution of the computer executable components stored in the memory 102. The at least one processor 104 can be directly involved in the execution of the computer executable component(s), according to an aspect. Additionally or alternatively, the at least one processor 104 can be indirectly involved in the execution of the computer executable component(s). For example, the at least one processor 104 can direct one or more components to perform the operations.

It is noted that although one or more computer executable components may be described herein and illustrated as components separate from memory 102 (e.g., operatively connected to memory), in accordance with various embodiments, the one or more computer executable components could be stored in the memory 102. Further, while various components have been illustrated as separate components, it will be appreciated that multiple components can be implemented as a single component, or a single component can be implemented as multiple components, without departing from example embodiments.

System 100 can include a resource manager 106 that can be configured to analyze a resource of interest and determine how the resource of interest is distributed across radios located within the sector. The resources that can be managed include, but are not limited to, voice capacity and data capacity. According to some implementations, resources that can be managed include power, codes, erlangs (e.g., a unit that measures network traffic), radio links, and/or combinations thereof. Additionally or alternatively, resources that can be managed include resource blocks, scheduler blocks or scheduler slots, frequency layers, power settings, power utilization, IP loading, quality of service (QoS), and/or combinations thereof. In accordance with some implementations, management of resources can include balancing a load (e.g., a network traffic load) associated with cellular network coverage and Wi-Fi network coverage. However, it should be understood that resources other than those listed can be managed in accordance with the disclosed aspects.

The resource manager 106 can be configured to receive an indication of the one or more resources that should be analyzed. For example, the selection of resource(s) of interest can be dynamically configurable such that different resources can be analyzed depending on various parameters (e.g., network operating procedures, system efficiencies, and so forth). Further, although a particular resource might be analyzed and balanced during a first balancing procedure, a different resource might be analyzed and balanced during a second balancing procedure, which can be a function of changing conditions at the sector. In another implementation, the resource(s) of interest can be identified based on an input that is received (e.g., from a network component, from a network operator, and so on) at about the same time that the resources should be analyzed.

In an implementation, the resource manager 106 can be configured to use a measurement of capacity per radio to determine how the network load is distributed. For example, the resource manager 106 can determine the mean capacity (e.g., average capacity) per radio, such as by using the number of radio links (e.g., the number of voice sessions being used). However, it is noted that resource manager 106 can utilize other resources to measure the capacity per radio and radio links are merely an example. The resource manager 106 can further use the measurement of capacity per radio to determine the average capacity difference for each radio from the mean (e.g., average) value. For example, resource manager 106 can determine whether the measured capacity for each radio is higher than the mean, lower than the mean, or about equal to the mean to determine how the network load is distributed.

If the resource manager 106 determines that the one or more resources of interest are not distributed relatively evenly within a sector and/or if rebalancing should be performed to improve system performance, a notification is sent to a resource balancer 108. Based on the resource(s) of interest, resource balancer 108 can be configured to determine how to redistribute the resource(s) to achieve the desired result (e.g., reduction in dropped calls, better system performance, and so forth).

The resource balancer 108 can be configured to slowly move network traffic between the radios in order to more evenly distribute the resource(s). In an implementation, the resource balancer 108 can choose a parameter that has predefined (e.g., small) increments in order to level the network load among the radios. For example, in an UMTS implementation, the parameter Qoffset2sn, which is an offset value representing an offset between a source cell and a target cell, can be used by the resource balancer 108 to level the load.

The resource manager 106 can continue to monitor the one or more resources of interest. The monitoring can be performed periodically, continuously, or based on some other parameter (e.g., based on an indication of heavy usage, an indication of network traffic nearing a congestion level, and so forth). In an example, at about the same time as the resource balancer 108 moves the user devices (e.g., network traffic) among the radios, the resource manager 106 can review the one or more resources of interest and determine whether more adjustments should be made. In such a manner, a feedback loop can be provided wherein resource balancer 108 continues to redistribute resources incrementally until a more balanced network is achieved.

In accordance with some aspects, system 100 can comprise a database 110 that can store default parameter values, which can be the parameter values before load balancing is performed. According to an aspect, the parameter values at each iteration of the load balancing can be stored in the database. If it is determined that network performance or network traffic levels drop below a certain threshold level, the default parameter values can be restored and/or parameter values at a previous iteration (which exhibited network performance or network traffic levels above the threshold level) can be restored.

It is noted that a database can include volatile memory or nonvolatile memory, or can include both volatile memory and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which can operate as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, and so on) of the various disclosed aspects is intended to comprise, without being limited to, these and any other suitable types of memory.

Figure 2:
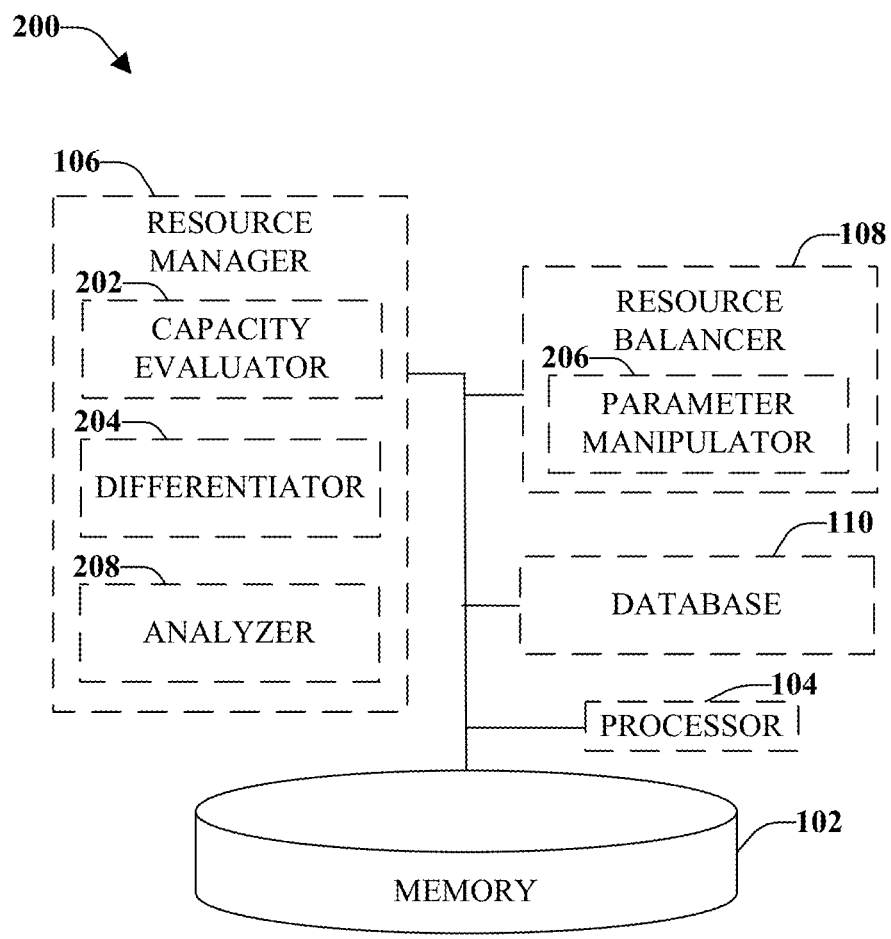
FIG. 2 illustrates an example, non-limiting system configured to balance resources in a wireless communications network, according to an aspect.

FIG. 2 illustrates an example, non-limiting system 200 configured to balance resources in a wireless communications network, according to an aspect. System 200 can move network traffic between two or more radios in a sector in order to more appropriately balance resources within the sector. The balancing of the resources can provide a better user experience, including a reduction in the number of dropped calls.

As discussed, it can be beneficial to improve the sector level spectral efficiency (bps/Hz/sector) as well as the system spectral efficiency. Since the sector level spectral efficiency interacts with other sectors, a balanced load across radios on a given sector should be attempted. Using a measure of capacity per radio (which will be discussed in further detail below), the system 200 can attempt to balance each radio (carrier).

Included in system 200 can be a capacity evaluator 202 that can be configured to compute the mean capacity per carrier (Carrier_mean_cap). According to an implementation, capacity evaluator 202 can ascertain the capacity utilized compared to the network traffic carried, such as by evaluating the number of radio links used and the equivalent erlang.

Also included in system 200 can be a differentiator 204 that can be configured to compute the (average) capacity difference (+/−) for each carrier from the mean. The average capacity difference for each carrier can be above (+) the mean or below (−) the mean.

Based on the average capacity difference, a parameter manipulator 206 can choose a parameter with pre-defined increments in order to level the load amongst the carriers and adjust the parameters per carrier towards the mean. For example, in an UMTS implementation, the parameter manipulator 206 can use Qoffset2sn, which biases selection of one carrier over another carrier by a certain dB level (e.g., received signal code power (RSCP), energy per chip-to-total noise and interference power spectral density (Ec/No), and so forth). In an implementation, the parameter manipulator 206 can adjust the Qoffset2sn by +1 dB from Carrier x to Carrier_mean_cap.

Also included in system 200 can be an analyzer 208 that can be configured to determine if the load between radios has been balanced. For example, analyzer 208 can determine if the max(Capacity_carrier_x−Carrier_mean_cap) is more than 1 dB. If the maximum is less than 1 dB, no further action is taken. If the maximum is more than 1 dB, through a feedback loop, the capacity evaluator 202 (or another system component) can be triggered and the mean capacity per carrier can be computed again, which should be different since the load has been distributed, at least incrementally. A similar process can be performed by the system components until the max(Capacity_carrier_x−Carrier_mean_cap) is less than 1 dB, according to an aspect.

Thus, the appropriate input for the condition (e.g., resource) to be balanced can be analyzed. For example, assume there are four resources (or four carriers) and radio links are to be balanced. For those four carriers, the load across each carrier on the specific group in the face can be analyzed to determine if the carriers are balanced. In this example, a first carrier has 50 links, a second carrier has 5 links, a third carrier has 17 links, and a fourth carrier has 12 links. Thus, system will attempt to achieve a more even state among the carriers. For example, appropriate offsets values can be set to achieve a more even balance of radio links across the carriers.

In another example, if the resource of interest is a scheduler, all the resources on the face can be evaluated. If it is determined that there are 120 user devices in the scheduler on a first radio and on a second radio there are 12 users, the network traffic should be shifted from the first radio to the second radio. The shifting of the network traffic can be performed between the two radios in order to rebalance the network traffic such that each radio has network traffic that represents around 55 and 75 users, in this example. Such balancing can provide an increased level of throughput for the user devices, which can provide a better user experience.

Figure 3:
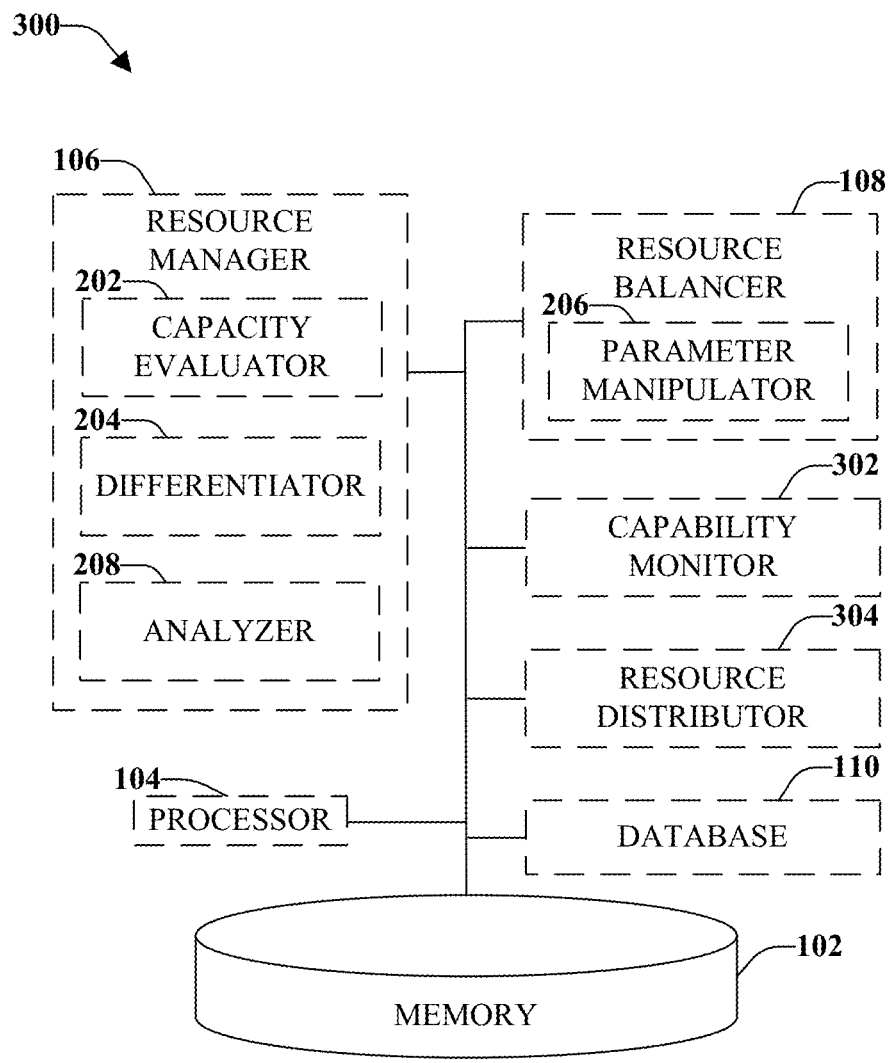
FIG. 3 illustrates an example, non-limiting system that can be configured to define capacity, according to an aspect.

FIG. 3 illustrates an example, non-limiting system 300 that can be configured to define capacity, according to an aspect. System 300 can include a capability monitor 302 that can be configured to determine the maximum amount of a resource that can be handled by a carrier without a degradation in services. For example, if scheduler slots are the resource of interest, capability monitor 302 can determine the highest number of scheduler slots that can be adequately handled by the carrier under evaluation. Further, the capability monitor 302 can determine a more optimal number of resources (scheduler slots in this example) that should be handled by the carrier of interest. The more optimal number of resources could be more than the number currently being handled, less than the number currently being handled, or approximately the same as the number currently being handled. For example, the maximum number of schedule slots that might be able to be handled by the carrier might be 100 scheduler slots, however, it might be better if the carrier only handled a maximum of 70 scheduler slots.

In an implementation, the capacity evaluator 202 might determine that a first carrier is handling 81 scheduler slots, a second carrier is handling 65 scheduler slots, and a third carrier is handling 65 scheduler slots. In this case, although the discrepancy between the carriers is not a large discrepancy, the resource balancer 108 might decide that some of the load (e.g., scheduler slots) should be moved off the first carrier and pushed to the second and third carriers. The redistribution of the load can be performed in order to bring the number of scheduler slots handled by each carrier closer to an even distribution of resources.

To determine how to distribute the resources among the three carriers in the above example, differentiator 204 can compute an average capacity difference for each carrier from a mean value. For example, capacity evaluator 202 can determine that the mean capacity per carrier (in the above example) is about 70 scheduler slots (e.g., 81+65+65=211/3=70.3). Thus, a resource distributor 304 can determine that the first carrier is 11 scheduler slots above the mean and the second and third carrier are 5 scheduler slots below the mean. The resource balancer 108 can utilize the difference from the mean to redistribute the resources, according to an aspect (e.g., move 10 user devices from the first carrier, wherein 5 are moved to the second carrier and 5 are moved to the third carrier).

In an implementation, the capacity evaluator 202 (or another system component) can be configured to evaluate benefits of various approaches in order to utilize the appropriate approach. For example, capacity evaluator 202 can consider one or more of the capacity gained versus the quality under a given capacity and/or the coverage under the given capacity.

The capacity can be defined through one or more measurement approaches. For example, a measurement approach can be defined as the percentage of network traffic gained versus the baseline (e.g., the network traffic before changes). For example this metric can be represented as the "traffic after changes" minus "traffic before changes" divided by traffic before changes, which can be expressed as:

(traffic after changes−traffic before changes)/traffic before changes

Although the above metric can be useful, the metric does not take into account additional potential headroom in capacity in the absence of artificially loading up the system to test the limits.

Another example of a measurement approach that can be used to define capacity includes the capacity utilized verses the network traffic carried, for example. In an implementation, a power/equivalent erlang measurement can be used for the definition. In another implementation, the radio links used/equivalent erlang can be utilized for the definition. In a further implementation, the percentage of radio links used versus the maximum (e.g., links used/links possible) can be utilized for the definition of capacity.

For the power/equivalent erlang measurement approach, the amount of amplifier power utilized (e.g., for power limited systems such as UMTS or LTE) as a measure of the capacity utilized and the amount of equivalent erlangs for a measure of network traffic is used. Thus, when comparing two algorithms, the algorithm with the smallest power used/equivalent erlang is desired, assuming equivalent quality and capacity.

In high capacity venue situations, while power is a good measure to indicate how much of the total amplifier capacity (and, thus, carrier capacity) is being used in the system, if a carrier uses data and voice, it does not allow prioritization of voice versus data. Thus, it may be useful to break down power into voice power and data power. Unfortunately, in UMTS this may not be possible in some situations, since in these situations breakdowns of power are non-HS power (which includes voice+ADCH-HS signaling+R99 data) and HS power (power for HSPA). For this reason, in some high capacity situations, it may be useful to allocate resources based on links used, which will be described in further detail below.

Collecting power measurements can be possible during a set of variable amounts of time. For example, collection of power measurements might be performed every fifteen minutes from the operational support system (OSS). However, according to other implementations, the collection of power measurements can be performed at other time intervals, including random time intervals.

For the radio links used/equivalent erlang measurement approach, the number of radio links utilized can be analogous to how many voice sessions are being used. This measurement can be useful to allocate resources primarily based on voice, and data takes the resources secondarily, as might be useful in some high capacity situations.

Using the number of radio links can be a useful measure, as it can be measured relatively quickly in wireless systems. For example, a command can be issued that will return the number of radio links for all carriers on a given cell site. Another advantage of this measurement approach is that it is often available near real-time (e.g., approximately once a minute) from the OSS.

For the percentage radio links used measurement approach, the total number of radio links utilized can be measured as a function of the total number of links possible. For example, the number of links utilized should take into account first, the four way handover links. According to an aspect, the total number of links possible could be used as the maximum number of codes possible.

A potential drawback of the above mentioned measurement approaches is that such approaches do not necessarily evaluate future events that might occur. For example, such approaches do not anticipate further network traffic that may be coming into the system, such as the case for venues that will have a larger than usual amount of network traffic. These types of venues can include stadiums that have a very large number of users where it might be somewhat necessary to look ahead in time and prepare for potential network traffic coming in order to avoid potential overloads (e.g., a network traffic congestion situation). Therefore, according to an aspect, another way that capacity can be defined is through the use of weights or rankings for each resource. For example, the capacity can be defined as weight1 multiplied by the capacity utilized plus the sum of one minus weight1 multiplied by the capacity needed by inactive but registered users/camping users versus the network traffic carried. This can be expressed as:

weight1*Capacity utilized+(1−weight1)*(Capacity needed by inactive but registered/camping users) vs. traffic carried The above noted measurement approach can vary the weight percentage trades-off capacity now versus future needs. Capacity utilized in this case can be defined as "power", "number of radio links", and "capacity needed", which could be a function of the average capacity used by active users.

In a similar manner, there can be several ways to measure quality. The quality measurement should balance dropped calls, blocked calls for voice and coverage, while some measure of data performance may be useful as well. However in some cases, improvement of voice often covers data concerns. The methods to measure these metrics can be a function of the technology and/or vendor implementation. While improving all three measurements individually can be different, it can be useful to combine the metrics into one composite metric.

According to an aspect, the composite metric can be determined based on a weighted linear average. This can be determined based on weight1 (w1) multiplied by the dropped call rate plus weight2 (w2) multiplied by the blocked call rate plus weight3 (w3) multiplied by the percentage coverage gain/loss verses the base line, which can be expressed as:

w1*dropped call rate+w2*blocked call rate+w3*% coverage gain/loss vs. baseline

The advantage of the above approach is that a determination of what the rates should be to match the composite metric versus customer opinion surveys and other information can be performed.

According to another aspect, the composite metric can be determined by a multiplicative metric, which can be determined based on a drop rate multiplied by the block rate multiplied by the percentage coverage gain/loss verses baseline. This can be expressed as:

drop rate*block rate*% coverage gain/loss vs. base line.

An advantage of the above approach is that it accomplishes the minimization of all three metrics. However, it does not have weights (e.g., ranking) to utilize in order to improve performance.

Additionally or alternatively, it is possible to use a composite metric that also includes capacity and the overall metric can be improved. However, in some aspects, a particular capacity approach can be chosen and then the quality can be measured. In an aspect, the quality can be measured by comparing to a similar network traffic load according to an example.

Figure 4:
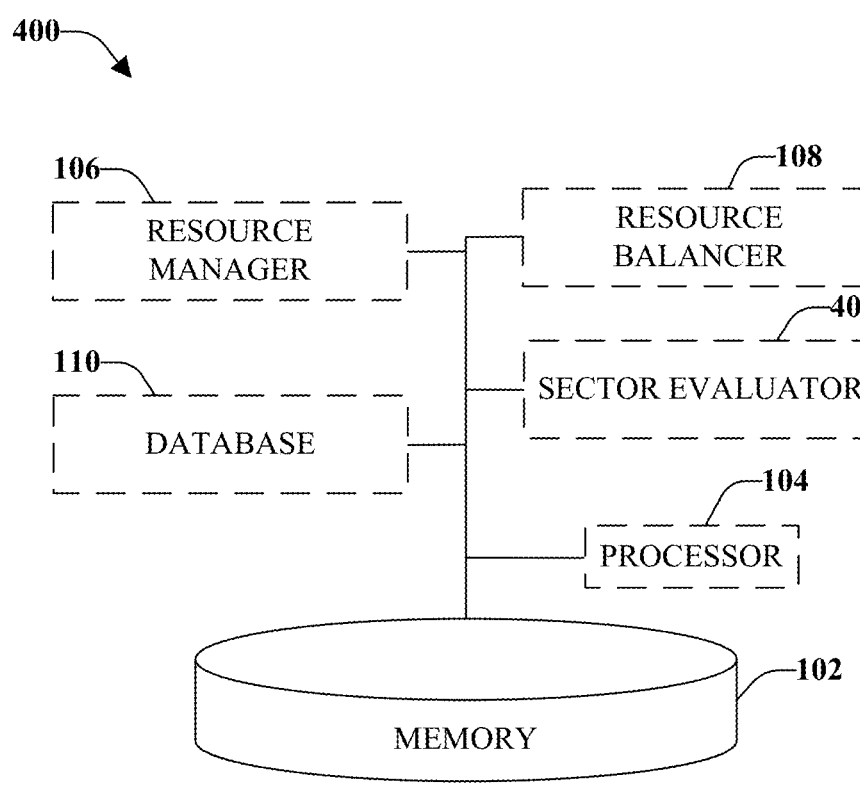
FIG. 4 illustrates an example, non-limiting system configured to shift resources between sectors, according to an aspect.

FIG. 4 illustrates an example, non-limiting system 400 configured to shift resources between sectors, according to an aspect. The system 400 can improve system spectral efficiency by adjusting parameters between radios and/or between sectors. A resource manager 106 can analyze the distribution of resources among radios in a sector. For example, the resource manager 106 can be configured to evaluate the distribution of the resources within the sectors by analyzing the one or more resources of interest to determine how those resources are distributed. For example, if radio links are the resource of interest, the resource manager 106 can determine the number of radio links for each radio in the same sector on a cell site. If the radio links (or other resource) under analysis are balanced fairly evenly across the radios, no further action is taken. However, if the radio links (or other resource(s)) under analysis are not proportionally balanced across the radios, further action can be taken by system 100 in order to more evenly balance the load (or to balance the load based on other considerations).

A resource balancer 108 can shift the network traffic from a heavily used radio to a lesser used radio in the same sector. Thus, the resource balancer 108 can be configured to redistribute the load. For example, the resource balancer 108 can set (or reset) offsets or other parameters in order to move some of the resources off a heavier loaded radio and onto a lesser loaded radio. The resource balancer 108 can redistribute the load in an attempt to achieve a better throughput, a better user experience, minimize blocking, reduce an amount of dropped calls and/or to achieve other considerations.

After the resources are balanced within the sector (e.g., the capacity of each carrier is within 1 dB of the average, for example), resources between sectors can be balanced. Included in system 400 is a sector evaluator 402 that can be configured to balance the load across or between adjacent sectors (e.g., between neighboring sectors). For example, to ensure that network traffic is not lost, the sector evaluator 402 can analyze coverage overlap between adjacent sectors and make a determination whether there is enough overlap such that network traffic can be moved (e.g., uniformly for all carriers on that sector) between the sectors. For example, resource balancer 108 can be configured to move network traffic from a first sector (e.g., the sector handling more network traffic) to a second sector (e.g., the sector handling less network traffic) until a balance between the sectors is achieved. In accordance with some aspects, resource balancer 108 can move the network traffic between the sectors until there is not enough coverage overlap available.

In an UMTS implementation, the resource balancer 108 can be configured to adjust the common pilot channel (CPICH) to push (e.g., re-route) network traffic from one sector to another sector. After some network traffic is moved, sector evaluator 402 can measure the network traffic and, if the network traffic is essentially balanced, no further action is taken. However, if the measurement by sector evaluator 402 reveals that the network traffic between the sectors is still unbalanced, resource balancer 108 can move additional network traffic. The feedback loop continues until the network traffic is nearly balanced between the sectors.

In accordance with some aspects, a condition can be established to determine whether or not network traffic should be moved between the sectors. For example, the condition can be that unless the capacity level carrier is greater than a certain level, then no adjacent sector balancing is performed. Additionally or alternatively, the default parameter values before any changes were made can be stored in the database 110. If network traffic levels drop below a certain level, then the original parameters retained in the database 110 can be restored. Further, parameter values at each iteration of the network traffic balancing can be stored in the database and, if needed, those parameter values can be reverted to if the network traffic level drops below the threshold level.

In another example, system 400 can be configured to use timing propagation delays, user device (e.g., handset) received GPS measurements, and so forth to determine the distance from the user device to the site. Based on this distance, it can be ascertained whether the user device could be moved to a different sector. If the user device is close to the heavily loaded sector, the user device might not be moved to another sector. Instead, the respective distance of other user devices can be evaluated and one or more of those devices can be moved to a different sector. However, if the user device is farther away from the heavily loaded sector, it might be appropriate to move the user device to another, less heavily loaded sector.

In a more detailed UMTS example, the overlap from Sector_ref to each adjacent neighboring Sector_y can be estimated, as SHOry. For each SHOry that is more than 1.3 dB, network traffic can be pushed from Sector_ref to Sector_y by adjusting the CPICH. The network traffic of Sector_ref as compared to each of Sector_y can be measured. If the network traffic measurements are essentially balanced (e.g., within some pre-defined measure), no further action is taken. If the network traffic measurements are not essentially balanced, the overlap from Sector_ref to each adjacent neighboring Sector_y is estimated and the process repeats. In such a manner, a continuous feedback loop is provided to monitor and improve system performance.

As discussed above, the coverage can be allowed to change between adjacent sectors by using parameter changes (e.g., in UMTS using CPICH). However, adjusting coverage through parameters might not be used. Instead, changing the coverage through antenna pattern shaping (e.g., tilts) can be utilized. One way to estimate what tilts are needed to obtain similar performance as the parameter changing approach, but by using tilts instead can be performed by first performing the parameter changes and then measuring the propagation delay of about 95% of the users for both the starting configuration and the ending parameter configuration. After these propagation delay values are obtained, after putting the parameters back to normal, the tilts can be adjusted in order to obtain similar propagation delay profiles of the final resulting parameter change configuration.

Figure 5:
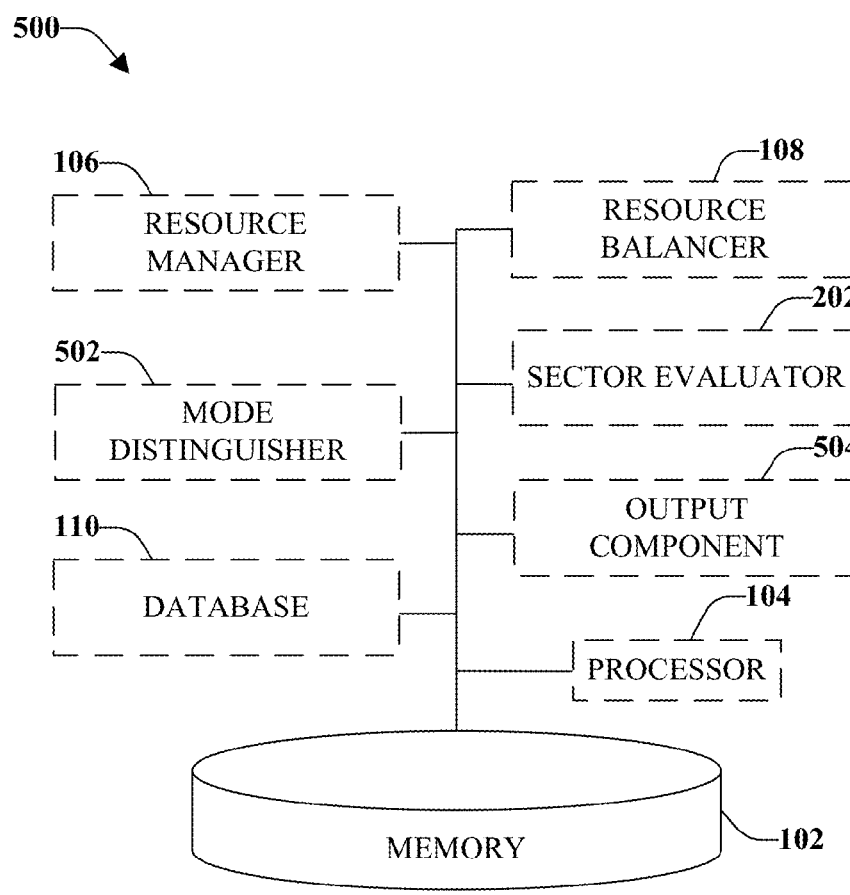
FIG. 5 illustrates an example, non-limiting system configured to balance resources based on user device activity level or mode, according to an aspect.

FIG. 5 illustrates an example, non-limiting system 500 configured to balance resources based on user device activity level or mode, according to an aspect. Included in system 500 can be a mode distinguisher 502 that can be configured to determine a mode for each user device and distribute the load based on the mode and the resource(s) of interest. User devices can be in one of at least three modes, which include an active mode, an idle mode, and other accessing devices (e.g., being admitting into the network, allowing utilization in the sector, and so forth).

Thus, the resource balancer 108 can move the network traffic between the radios (and/or between sectors) based on the activity of each respective user device. For example, mode distinguisher 502 can identify the user devices that are in idle mode (e.g., monitoring the network, camped waiting to use the network) and resource balancer 108 can move those user devices from a heavy used radio to a less heavily used radio. Moving the idle mode user devices allows those devices to access the carrier unloaded when access is performed.

In another implementation, mode distinguisher 502 can identify user devices that are actively using the carrier (or the radio) and resource balancer 108 can move the active user devices from a heavily used radio to a less heavily used radio. In this case, a forced handover can be performed to redistribute the network traffic.

In a further implementation, mode distinguisher 502 might determine that user devices in the sectors (e.g., both active devices and idle devices) should not be moved between radios. Instead, user devices accessing the sector (e.g., obtaining access) should be directed by the resource balancer 108 (or another system component) to the radio that is less heavily used, as determined by the resource manager 106.

According to an implementation, system 500 can include an output component 504 that can be configured to interface with one or more other components (not shown), which can be components external to system and/or components internal to system. In an implementation, Wi-Fi network coverage can be incorporated with the wireless communications network (e.g., co-located in the same sector area) and the resource to be balanced might be the load associated with the Wi-Fi network coverage and the cellular network coverage in order to maintain (or to return to) an acceptable performance level.

Further to this example, if it is determined (e.g., by resource manager 106) that the Wi-Fi network is being very heavily used, the resource balancer 108 can move at least some of the network traffic from the Wi-Fi network to the cellular network. As used herein, the term "cellular" refers to any wireless technology including, but not limited to UMTS, LTE, 3GPP, 3GPP2, CDMA, as well as other standards.

In another implementation, network traffic might be moved from cellular network coverage to Wi-Fi network coverage. For example, when network traffic is moved from the Wi-Fi network, the output component 504 can communicate with, for example, an access network discovery and selection function (ANDSF). The ANDSF is an entity that assists with the discovery of non-3GPP access networks and can assist with the rules and/or policies associated with those networks. Thus, system 500 can perform the determination of whether network traffic or other resources should be distributed more evenly and, if needed, the information can be communicated to the ANDSF (in this example) and the ANDSF can change the policy. According to an implementation, if the Wi-Fi network is overloaded, the policy can be changed to re-route user devices off the Wi-Fi network and onto the cellular network.

According to another example, scheduler slots are the resource of interest. If the scheduler is full and the entire face is full, but the Wi-Fi network is available, it might be determined that network traffic should be re-routed to the Wi-Fi network to assist in offloading the face from the data perspective. It should be noted that the network traffic can be pushed in this manner, provided the service is appropriate and can manage the resources. For example, voice communications might not be able to be moved to the Wi-Fi network but data communications might be able to be moved to the Wi-Fi network (e.g., if the user device is relatively stationary).

Figure 6:
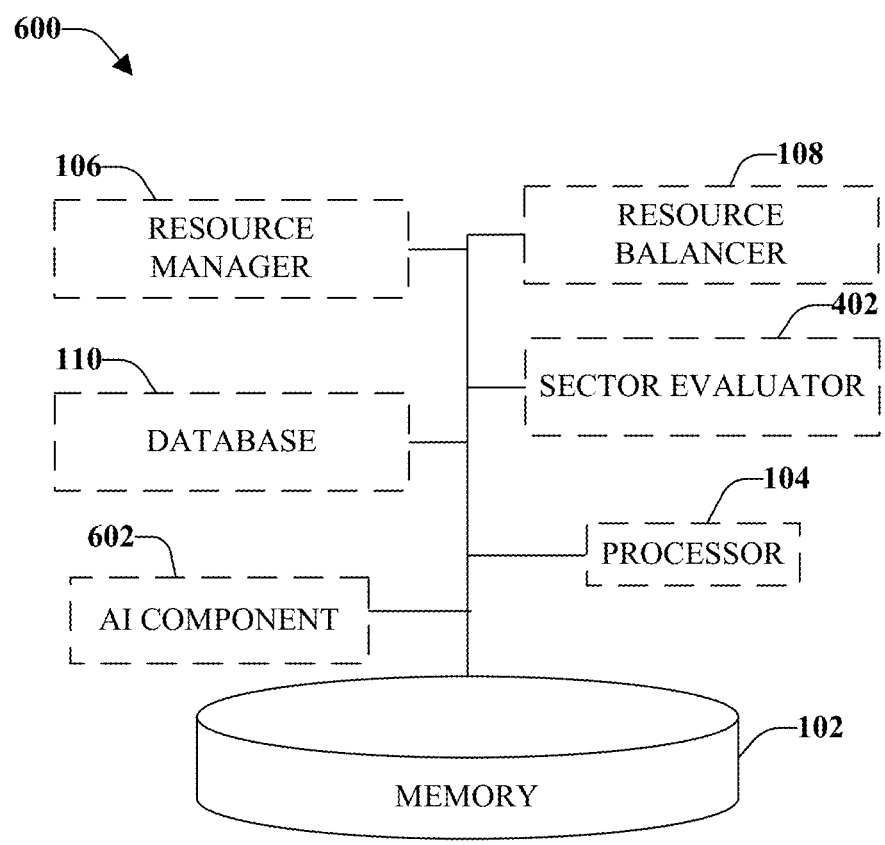
FIG. 6 illustrates an example, non-limiting system that employs an artificial intelligence component, which can facilitate automating one or more features in accordance with the disclosed aspects.

FIG. 6 illustrates an example, non-limiting system 600 that employs an artificial intelligence (AI) component 602, which can facilitate automating one or more features in accordance with the disclosed aspects. A memory 102, a processor 104, a resource manager 106, a resource balancer 108, a database 110, and a sector evaluator 402, as well as other components (not illustrated) can include functionality, as more fully described herein, for example, with regard to the previous figures. The disclosed aspects in connection with balancing network resources can employ various AI-based schemes for carrying out various aspects thereof. For example, a process for observing the network resources on each radio in a given sector (and/or between sectors) and redistributing the network resources between the radios in the sector (and/or between sectors), and so forth, can be facilitated with an example automatic classifier system and process. In another example, a process for evaluating which mobile devices to distribute among various radios based on the mode of the mobile device can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed. In the case of communication systems, for example, attributes can be network resources associated with a pair of sectors and/or carriers, and the classes can be a threshold condition with respect to the number of network resources. In another example, the attributes can be network resources and the classes can be a mobile device mode with respect to distribution of the network resources.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage, observing network event occurrences, receiving extrinsic information, and so on). For example, SVMs can be configured via a learning or training phase within a classifier constructor and feature selection module. Thus, the classifier(s) can be used to automatically learn and perform a number of functions, including but not limited to modifying one or more radio network parameters, moving network traffic between radios in a single sector, moving network traffic between radios of different sectors, and so forth. The criteria can include, but is not limited to, network traffic limitations, active mobile device applications, service provider preferences and/or policies, location of the mobile device, location of one or more sectors, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 7:
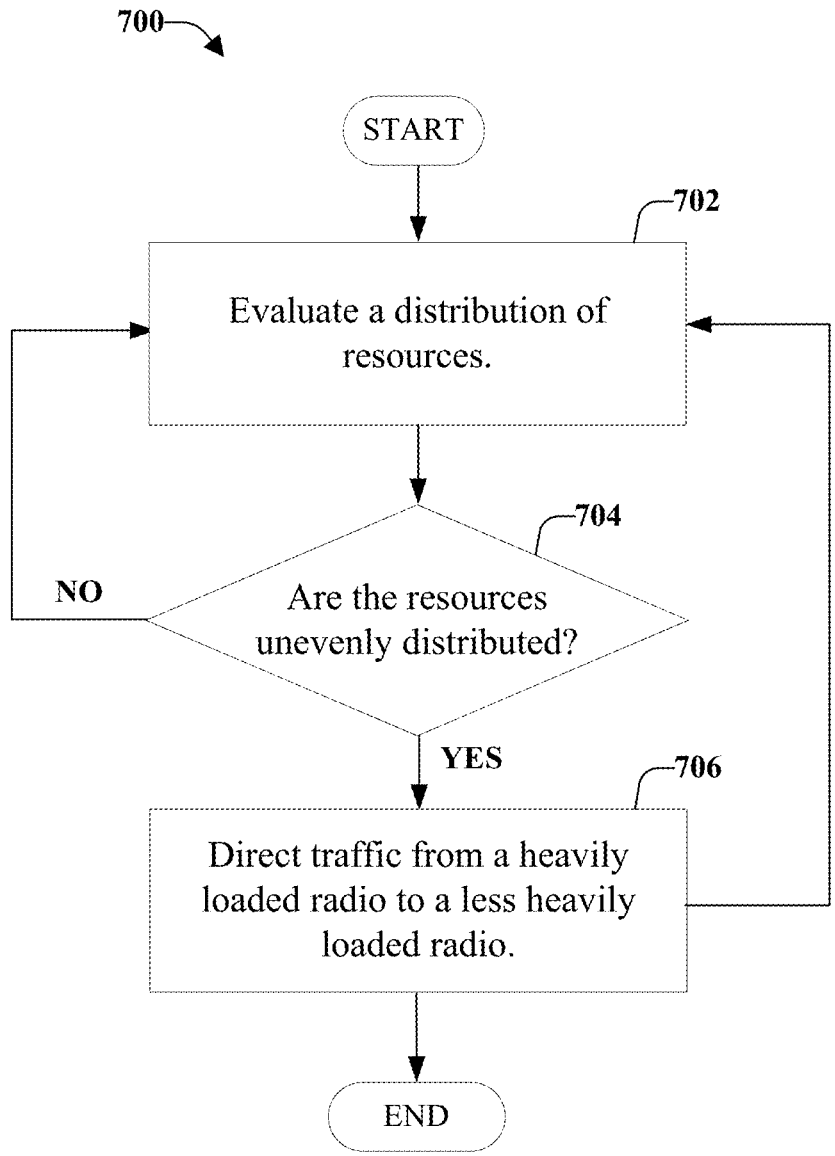
FIG. 7 illustrates an example, non-limiting method for detecting that a traffic load is unbalanced and automatically balancing the traffic load, according to an aspect.

FIG. 7 illustrates an example, non-limiting method 700 for detecting that a traffic load is unbalanced and automatically balancing the traffic load, according to an aspect. At 702, a distribution of one or more resources of interest on radios located in a single sector can be evaluated. At 704, a determination can be made whether the resource(s) of interest are unevenly distributed among radios located in the single sector, according to a criterion. The criterion can be a predefined criterion and/or can dynamically change based on network status and/or based on other conditions. For example, a determination can be made whether (e.g., based on percentages of traffic handled or based on another measurement) a first radio of the radios located in the single sector is handling more network traffic than a second radio of the radios located in the single sector. If the resources are not unevenly distributed ("NO"), method 700 can continue at 702 with further evaluation.

If the determination at 704 is that the resources are unevenly distributed ("YES"), at 706, the resource is balanced among the first radio and the second radio (e.g., according to the predefined criterion). For example, a first set of network traffic is directed from the first radio (e.g., the more heavily loaded radio) to the second radio (e.g., the less heavily loaded radio). In accordance with some aspects, method 700 can return to 702 (e.g., a feedback loop) with reevaluation of the distribution of the resource of interest (or a different resource of interest) between the first radio and the second radio. If it is determined, at 704, that the first radio is (still) handling more network traffic than the second radio, at 706, a second set of network traffic can be directed (e.g., moved) from the first radio to the second radio. In an implementation, directing the first set of network traffic, the second set of network traffic, or subsequent sets of network traffic can include adjusting an offset value representing an offset between the first radio and the second radio.

According to some implementations, evaluating and/or reevaluating the distribution of one or more resources of interest can include evaluating a distribution of a voice capability, a distribution of a data capability, or a distribution of both voice capability and data capability between the radios located in the single sector. Additionally or alternatively, the evaluating and/or reevaluating can include evaluating Wi-Fi network usage and cellular network usage between the radios located in the single sector.

In a further implementation, the method can include evaluating distribution of a load between the single sector and an adjacent sector. For example, the single sector can have a larger load as compared to the adjacent sector. In this case, network traffic can be moved from the single sector to the adjacent sector to balance the load between the single sector and the adjacent sector.

Figure 8:
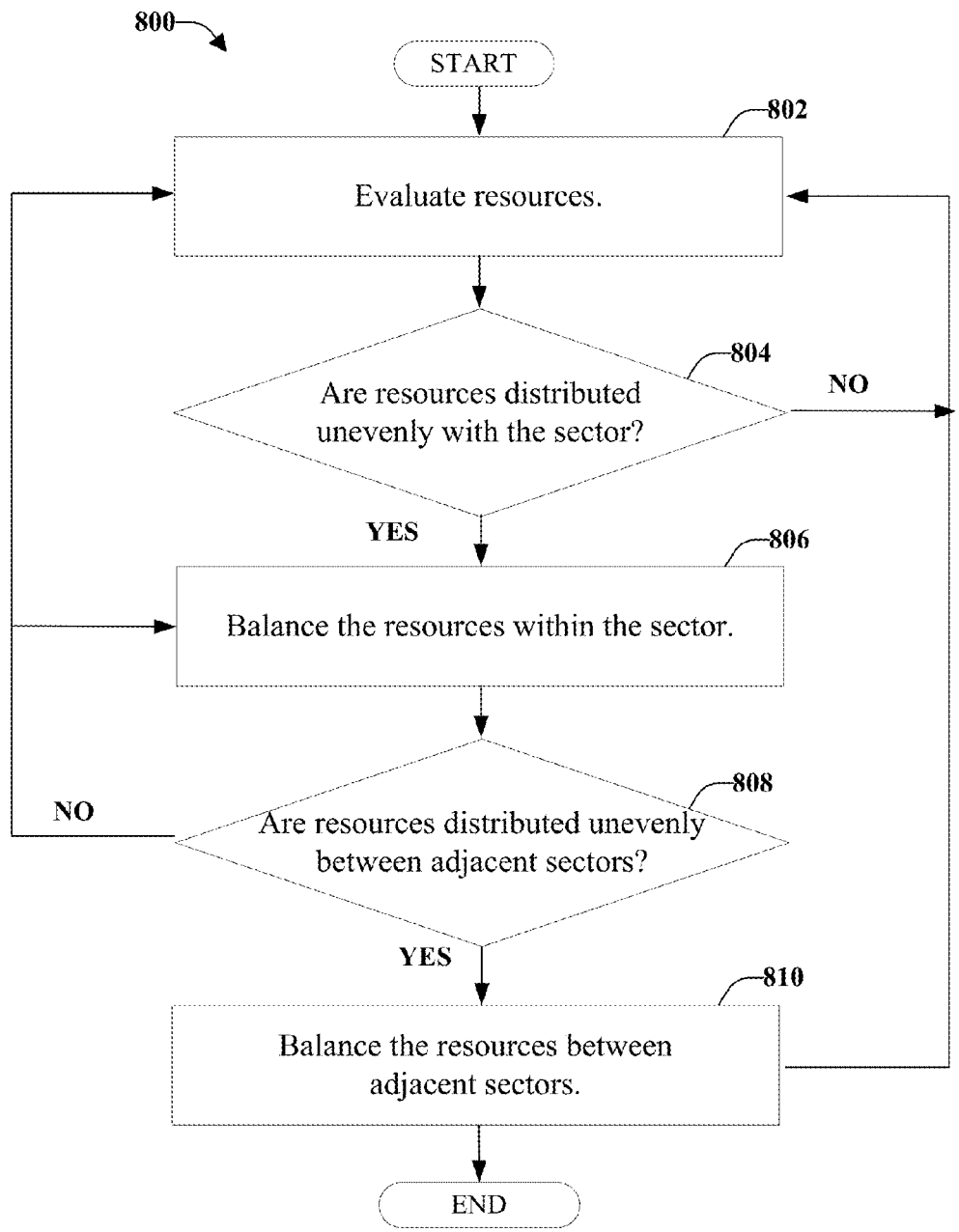
FIG. 8 illustrates an example, non-limiting method configured to manage resources in a wireless communications network, according to an aspect.

FIG. 8 illustrate an example, non-limiting method 800 configured to manage resources in a wireless communications network, according to an aspect. At 802, distribution of a resource between a first radio and a second radio within a sector is evaluated. In an implementation, the resource is a voice capability and the evaluation can include evaluating distribution of the voice capability between the first radio and the second radio within the sector. According to another implementation, the resource is a data capability and the evaluation can include evaluating distribution of the data capability between the first radio and the second radio within the sector. Additionally or alternatively, the evaluation can include evaluating Wi-Fi network usage and cellular network usage between the first radio and the second radio within the sector. The resource of interest can be received in an input that includes data representing an identification of the resource, according to an aspect.

At 804, a determination is made whether the resource is distributed unevenly. For example, it might be determined that the first radio comprises a higher distribution of the resource (e.g., is more heavily loaded) than the second radio. If the resources are distributed fairly evenly ("NO"), method 800 continues at 802 with further evaluation.

If the resources are not distributed fairly evenly ("YES"), at 806, the resource is balanced among the first radio and the second radio within the sector. For example, the resource can be balanced to more evenly distribute the resource between the first radio and the second radio.

According to an implementation, the balancing can include identifying respective operation modes of user devices using the first radio or the second radio and distributing the user devices between the first radio and the second radio based on the respective operation modes of the user devices. For example, the distributing can include moving idle mode user devices from the first radio to the second radio. In another example, the distributing can include moving active mode user devices from the first radio to the second radio. In yet another example, the distributing can include allowing other access user devices utilization in the sector, wherein the other access user devices are connected to the second radio.

In an implementation, method can include determining an average capacity for the first radio and the second radio and determining a first capacity difference from the average capacity for the first radio and a second capacity difference from the average capacity for the second radio. One or more parameters can be changed, using small or predefined increments, in order to level a load between the first radio and the second radio based on the first average capacity difference and the second average capacity difference.

Method 800 can also include evaluating, at 808, distribution of a load between the sector and an adjacent sector. For example, it can be determined whether the load between the adjacent sectors is distributed unevenly. If not distributed unevenly or distributed within a certain percentage difference ("NO"), method can continue at 802 and/or 808 with further evaluation.

If the determination at 808 is that the resources are distributed unevenly ("YES"), for example, it can be determined that the sector has a larger load compared to the adjacent sector. Thus, method 800 can continue at 810 and the resources can be balanced between the sectors. For example, network traffic can be moved from the heavily loaded sector to the adjacent sector to balance the load between the sector and the adjacent sector.

Figure 9:
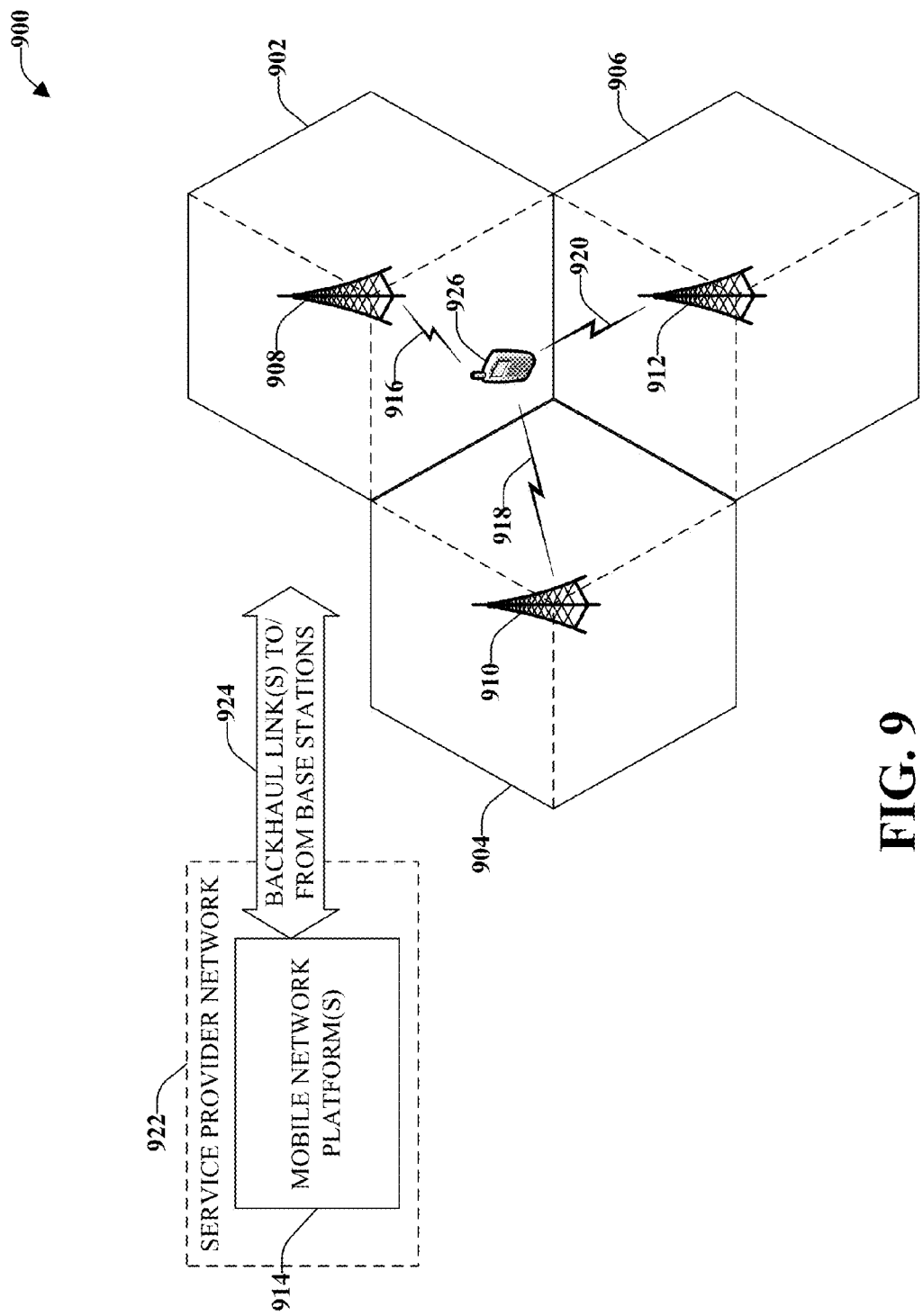
FIG. 9 is a schematic example wireless environment that can operate in accordance with aspects described herein.

By way of further description with respect to one or more non-limiting ways to detect unbalanced networks loads for radios within a sector and/or between sectors, FIG. 9 is a schematic example wireless environment 900 that can operate in accordance with aspects described herein. In particular, example wireless environment 900 illustrates a set of wireless network macro cells. Three coverage macro cells 902, 904, and 906 include the illustrative wireless environment; however, it is noted that wireless cellular network deployments can encompass any number of macro cells. Coverage macro cells 902, 904, and 906 are illustrated as hexagons; however, coverage cells can adopt other geometries generally dictated by a deployment configuration or floor plan, geographic areas to be covered, and so on. Each macro cell 902, 904, and 906 is sectorized in a 2π/3 configuration in which each macro cell includes three sectors, demarcated with dashed lines in FIG. 9. It is noted that other sectorizations are possible, and aspects or features of the disclosed subject matter can be exploited regardless of type of sectorization. Macro cells 902, 904, and 906 are served respectively through base stations or eNodeBs 908, 910, and 912. Any two eNodeBs can be considered an eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 914, and set of base stations (e.g., eNode B 908, 910, and 912) that serve a set of macro cells; electronic circuitry or components associated with the base stations in the set of base stations; a set of respective wireless links (e.g., links 916, 918, and 920) operated in accordance to a radio technology through the base stations, form a macro radio access network (RAN). It is further noted that, based on network features, the radio controller can be distributed among the set of base stations or associated radio equipment. In an aspect, for UMTS-based networks, wireless links 916, 918, and 920 embody a Uu interface (UMTS Air Interface).

Mobile network platform(s) 914 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any EM frequency bands licensed by the service provider network 922 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 914 can control and manage base stations 908, 910, and 912 and radio component(s) associated thereof, in disparate macro cells 902, 904, and 906 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), mobile network platform 914 can be embodied in the service provider network 922.

In addition, wireless backhaul link(s) 924 can include wired link components such as T1/E1 phone line; a digital subscriber line (DSL) either synchronous or asynchronous;

an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 924 embodies IuB interface.

It is noted that while exemplary wireless environment 900 is illustrated for macro cells and macro base stations, aspects, features and advantages of the disclosed subject matter can be implemented in microcells, picocells, femto cells, or the like, wherein base stations are embodied in home-based equipment related to access to a network.

Figure 10:
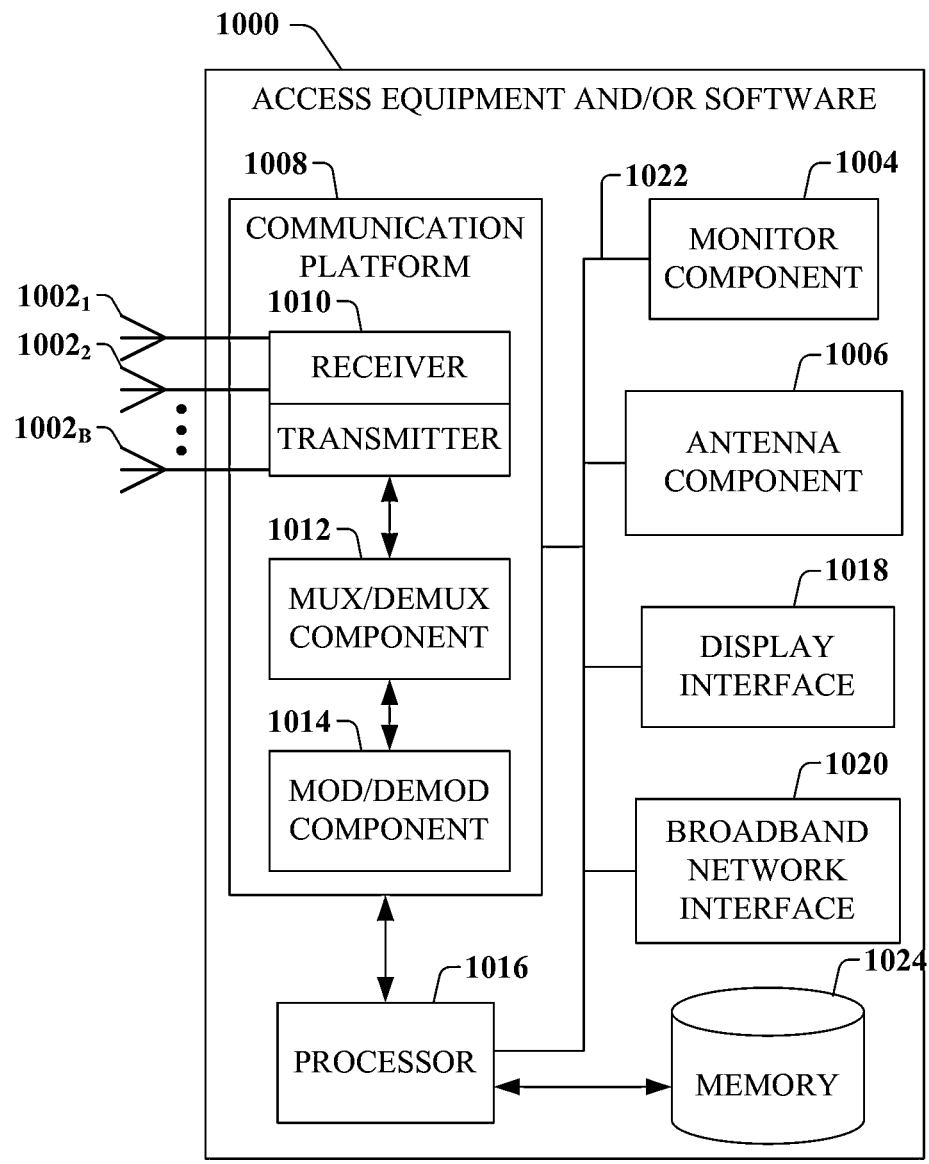
FIG. 10 illustrates a block diagram of access equipment and/or software related to access of a network, in accordance with an embodiment.

To provide further context for various aspects of the disclosed subject matter, FIG. 10 illustrates a block diagram of an embodiment of access equipment and/or software 1000 related to access of a network (e.g., base station, wireless access point, femtocell access point, and so forth) that can enable and/or exploit features or aspects of the disclosed aspects.

Access equipment and/or software 1000 related to access of a network can receive and transmit signal(s) from and to wireless devices, wireless ports, wireless routers, etc. through segments $1002_1$-$1002_B$ (B is a positive integer). Segments $1002_1$-$1002_B$ can be internal and/or external to access equipment and/or software 1000 related to access of a network, and can be controlled by a monitor component 1004 and an antenna component 1006. Monitor component 1004 and antenna component 1006 can couple to communication platform 1008, which can include electronic components and associated circuitry that provide for processing and manipulation of received signal(s) and other signal(s) to be transmitted.

In an aspect, communication platform 1008 includes a receiver/transmitter 1010 that can convert analog signals to digital signals upon reception of the analog signals, and can convert digital signals to analog signals upon transmission. In addition, receiver/transmitter 1010 can divide a single data stream into multiple, parallel data streams, or perform the reciprocal operation. Coupled to receiver/transmitter 1010 can be a multiplexer/demultiplexer 1012 that can facilitate manipulation of signals in time and frequency space. Multiplexer/demultiplexer 1012 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 1012 can scramble and spread information (e.g., codes, according to substantially any code known in the art, such as Hadamard-Walsh codes, Baker codes, Kasami codes, polyphase codes, and so forth).

A modulator/demodulator 1014 is also a part of communication platform 1008, and can modulate information according to multiple modulation techniques, such as frequency modulation, amplitude modulation (e.g., M-ary quadrature amplitude modulation (QAM), with M a positive integer); phase-shift keying (PSK); and so forth).

Access equipment and/or software 1000 related to access of a network also includes a processor 1016 configured to confer, at least in part, functionality to substantially any electronic component in access equipment and/or software 1000. In particular, processor 1016 can facilitate configuration of access equipment and/or software 1000 through, for example, monitor component 1004, antenna component 1006, and one or more components therein. Additionally, access equipment and/or software 1000 can include display interface 1018, which can display functions that control functionality of access equipment and/or software 1000, or reveal operation conditions thereof. In addition, display interface 1018 can include a screen to convey information to an end user. In an aspect, display interface 1018 can be an LCD (Liquid Crystal Display), a plasma panel, a monolithic thin-film based electrochromic display, and so on. Moreover, display interface 1018 can include a component (e.g., speaker) that facilitates communication of aural indicia, which can also be employed in connection with messages that convey operational instructions to an end user. Display interface 1018 can also facilitate data entry (e.g., through a linked keypad or through touch gestures), which can cause access equipment and/or software 1000 to receive external commands (e.g., restart operation).

Broadband network interface 1020 facilitates connection of access equipment and/or software 1000 to a service provider network (not shown) that can include one or more cellular technologies (e.g., 3GPP UMTS, GSM, and so on.) through backhaul link(s) (not shown), which enable incoming and outgoing data flow. Broadband network interface 1020 can be internal or external to access equipment and/or software 1000, and can utilize display interface 1018 for end-user interaction and status information delivery.

Processor 1016 can be functionally connected to communication platform 1008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1016 can be functionally connected, through data, system, or an address bus 1022, to display interface 1018 and broadband network interface 1020, to confer, at least in part, functionality to each of such components.

In access equipment and/or software 1000, memory 1024 can retain location and/or coverage area (e.g., macro sector, identifier(s)), access list(s) that authorize access to wireless coverage through access equipment and/or software 1000, sector intelligence that can include ranking of coverage areas in the wireless environment of access equipment and/or software 1000, radio link quality and strength associated therewith, or the like. Memory 1024 also can store data structures, code instructions and program modules, system or device information, code sequences for scrambling, spreading and pilot transmission, access point configuration, and so on. Processor 1016 can be coupled (e.g., through a memory bus), to memory 1024 in order to store and retrieve information used to operate and/or confer functionality to the components, platform, and interface that reside within access equipment and/or software 1000.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to improve space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1024, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

Figure 11:
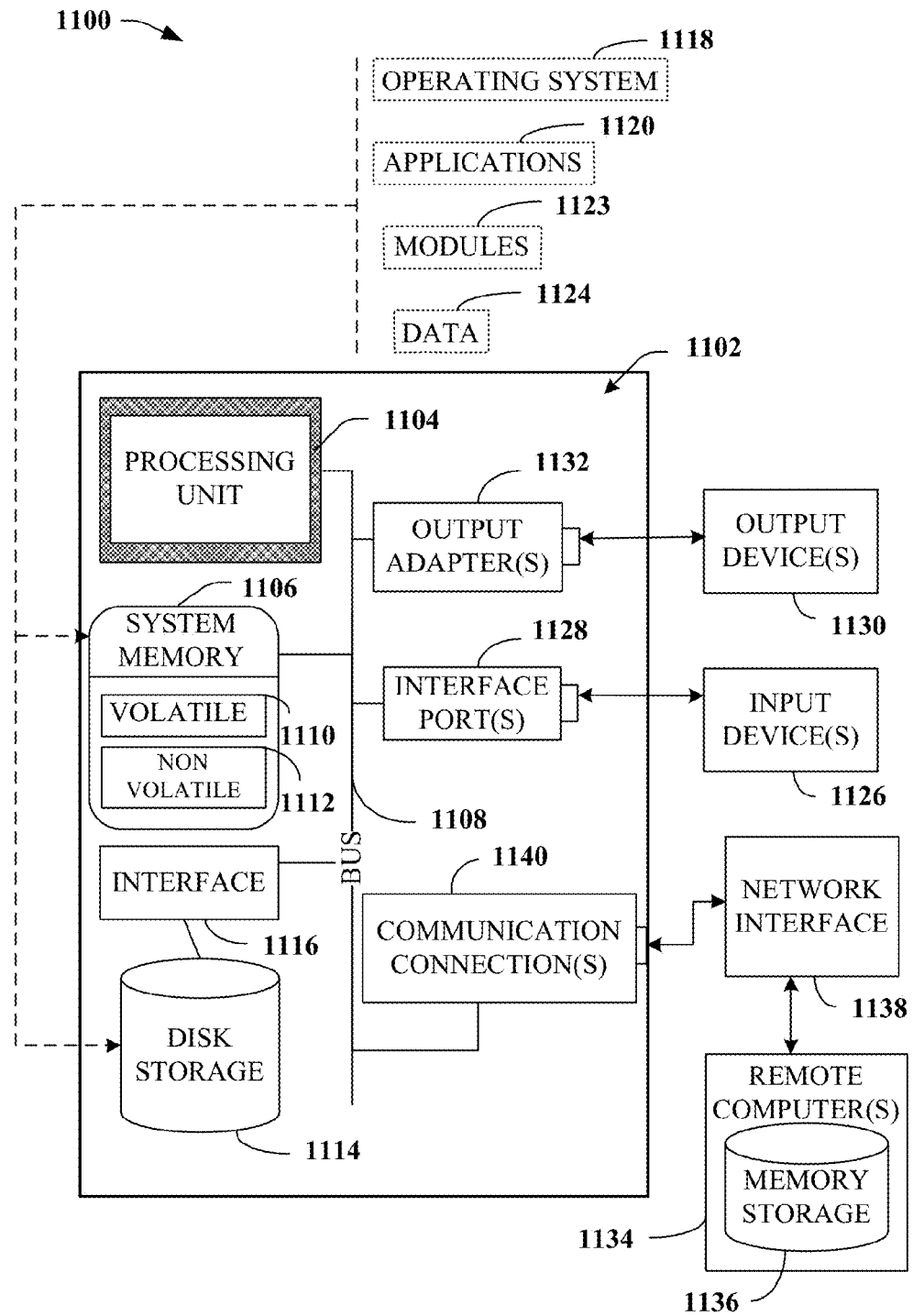
FIG. 11 illustrates a block diagram of a computing system, in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in a memory (such as memory 102) there can be software, which can instruct a processor (such as processor 104) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a PDA, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1102 includes a processing unit 1104, a system memory 1106, and a system bus 1108. System bus 1108 couples system components including, but not limited to, system memory 1106 to processing unit 1104. Processing unit 1104 can be any of various available processors. Dual microprocessors and other multiprocessor architectures also can be employed as processing unit 1104.

System bus 1108 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1106 includes volatile memory 1110 and nonvolatile memory 1112. A basic input/output system (BIOS), containing routines to transfer information between elements within computer 1102, such as during start-up, can be stored in nonvolatile memory 1112. By way of illustration, and not limitation, nonvolatile memory 1112 can include ROM, PROM, EPROM, EEPROM, or flash memory. Volatile memory 1110 can include RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1102 also includes removable/non-removable, volatile/non-volatile computer storage media. In an implementation, provided is a non-transitory or tangible computer-readable medium storing computer-executable instructions that, in response to execution, cause a system including a processor to perform operations. The operations can include determining a mean capacity for a first carrier in a sector and a second carrier in the sector. The operations can also include determining a first average capacity difference from the mean capacity for the first carrier and a second average capacity difference from the mean capacity for the second carrier. Further, the operations can include changing a first parameter (e.g., a parameter between carriers (e.g., radios), a parameter between sectors (e.g., sites), and so forth) to level a load between the first carrier and the second carrier. The load is level when the first average capacity difference and the second average capacity difference are nearly equal. As utilized herein, nearly equal can mean equal, within a few values, within a certain range, within a percentage, plus or minus a specific value, and so on, In accordance with some aspects, the operations can include determining that the load between the first carrier and the second carrier is not nearly equal and changing the first parameter or a second parameter to level the load between the first carrier and the second carrier. In a further aspect, the operations can include estimating a network traffic overlap between the sector and an adjacent sector and pushing traffic from the sector to the adjacent sector, wherein a first traffic load of the sector is heavier than a second traffic load of the adjacent sector.

FIG. 11 illustrates, for example, disk storage 1114. Disk storage 1114 includes, but is not limited to, devices such as a magnetic disk drive, floppy disk drive, tape drive, Jaz drive, Zip drive, LS-100 drive, flash memory card, or memory stick. In addition, disk storage 1114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1114 to system bus 1108, a removable or non-removable interface is typically used, such as interface component 1116.

It is to be noted that FIG. 11 describes software that acts as an intermediary between users and computer resources described in suitable operating environment. Such software includes an operating system 1118. Operating system 1118, which can be stored on disk storage 1114, acts to control and allocate resources of computer system 1102. System applications 1120 can take advantage of the management of resources by operating system 1118 through program modules 1122 and program data 1124 stored either in system memory 1106 or on disk storage 1114. It is to be understood that the disclosed subject matter can be implemented with various operating systems or combinations of operating systems.

A user can enter commands or information, for example through interface component 1116, into computer system 1102 through input device(s) 1126. Input devices 1126 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1104 through system bus 1108 through interface port(s) 1128. Interface port(s) 1128 include, for example, a serial port, a parallel port, a game port, and a universal serial bus (USB). Output device(s) 1130 use some of the same type of ports as input device(s) 1126.

Thus, for example, a USB port can be used to provide input to computer 1102 and to output information from computer 1102 to an output device 1130. Output adapter 1132 is provided to illustrate that there are some output devices 1130, such as monitors, speakers, and printers, among other output devices 1130, which use special adapters. Output adapters 1132 include, by way of illustration and not limitation, video and sound cards that provide means of connection between output device 1130 and system bus 1108. It is also noted that other devices and/or systems of devices provide both input and output capabilities such as remote computer(s) 1134.

Computer 1102 can operate in a networked environment using logical connections to one or more remote computers, such as remote computer(s) 1134. Remote computer(s) 1134 can be a personal computer, a server, a router, a network PC, a workstation, a microprocessor based appliance, a peer device, or other common network node and the like, and typically includes many or all of the elements described relative to computer 1102.

For purposes of brevity, only one memory storage device 1136 is illustrated with remote computer(s) 1134. Remote computer(s) 1134 is logically connected to computer 1102 through a network interface 1138 and then physically connected through communication connection 1140. Network interface 1138 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1140 refer(s) to hardware/software employed to connect network interface 1138 to system bus 1108. While communication connection 1140 is shown for illustrative clarity inside computer 1102, it can also be external to computer 1102. The hardware/software for connection to network interface 1138 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," "module", and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
  a processor; and
  a memory that stores executable instructions that, when executed by the processor, facilitate performance of operations, comprising
    evaluating distribution of a resource between a first radio of a first network device and a second radio of a second network device within a sector of a set of network devices of a network;
    determining the resource is distributed unevenly according to a criterion, wherein the first radio comprises a first portion of the distribution that is different than a second portion of the distribution with the second radio;
    identifying respective operation modes of user devices using the first radio or the second radio;
    balancing the resource among the first radio and the second radio within the sector comprising balancing the first portion of the distribution and the second portion of the distribution according to the criterion to more evenly distribute the resource between the first radio and the second radio; and
    distributing a portion of the resource associated with the user devices between the first radio and the second radio based on the respective operation modes of the user devices and the evaluating the distribution of the resource between the first radio of the first network device and the second radio of the second network device.

2. The system of claim 1, wherein the resource is a voice capability, and the evaluating comprises evaluating the distribution of the voice capability between the first radio and the second radio within the sector of the set of network devices.

3. The system of claim 1, wherein the resource is a data capability and the evaluating comprises evaluating the distribution of the data capability between the first radio and the second radio within the sector of the set of network devices.

4. The system of claim 1, wherein the evaluating comprises evaluating Wi-Fi network usage of the user devices and cellular network usage of the user devices within the sector of the set of network devices.

5. The system of claim 1, wherein the operations further comprise:
  receiving data representing an identification of the resource.

6. The system of claim 1, wherein the distributing comprises moving idle mode user devices from the first radio to the second radio.

7. The system of claim 1, wherein the distributing comprises moving active mode user devices from the first radio to the second radio.

8. The system of claim 1, wherein the distributing comprises allowing other access user devices utilization in the sector, wherein the other access user devices are connected to the second radio.

9. The system of claim 1, wherein the operations further comprise:
determining an average capacity for the first radio and the second radio;
determining a first capacity difference from the average capacity for the first radio and a second capacity difference from the average capacity for the second radio; and
changing a parameter using predefined increments to level a network traffic load between the first radio and the second radio based on the first capacity difference and the second capacity difference.

10. The system of claim 1, wherein the resource is a network load and the operations further comprise:
reevaluating the distribution of the network load between the sector and an adjacent sector, wherein the sector is determined to have a larger network load compared to the adjacent sector, and
moving network traffic from the sector to the adjacent sector to balance the network load between the sector and the adjacent sector.

11. A method, comprising:
evaluating, by a system comprising a processor, a distribution of a resource on radios located in a single sector;
determining, by the system, a first radio of the radios located in the single sector is handling more network traffic than a second radio of the radios located in the single sector, wherein the determining comprises evaluating Wi-Fi network usage and cellular network usage within the single sector;
directing, by the system, a first set of network traffic associated with a device from the first radio to the second radio based on the evaluating the distribution of the resource, and an operation mode of the device, wherein the operation mode is one mode from a group of modes comprising an active mode and an idle mode associated with different levels of activity with respect to the radios; and
adjusting an offset value representing an offset to bias the directing the first set of network traffic from the first radio to the second radio based on the Wi-Fi network usage.

12. The method of claim 11, further comprising:
reevaluating, by the system, the distribution of the resource between the first radio and the second radio;
determining, by the system, the first radio is handling more network traffic than the second radio; and
directing, by the system, a second set of network traffic from the first radio to the second radio.

13. The method of claim 11, wherein the determining comprises evaluating a first portion of the distribution associated with a voice capability and a second portion of the distribution associated with a data capability between the radios located in the single sector.

14. The method of claim 11, further comprising:
evaluating, by the system, a portion of the distribution associated with a traffic load between the single sector and an adjacent sector, wherein the single sector is determined to have a larger network traffic load compared to the adjacent sector, and
moving, by the system, network traffic from the single sector to the adjacent sector to balance the network traffic load between the single sector and the adjacent sector.

15. A non-transitory machine-readable storage medium, comprising executable instructions that, when executed by a processor, facilitate performance of operations, comprising:
determining an average capacity for a first radio in a sector and a second radio in the sector;
determining a first capacity difference from the average capacity for the first radio and a second capacity difference from the average capacity for the second radio; and
incrementally adjusting, based on the first capacity difference, a first parameter between the first radio and the second radio to level a traffic load between the first radio and the second radio comprising causing a defined portion of the traffic load to move from the first radio to the second radio based on respective operation modes of devices, wherein the respective operation modes comprise an active mode and an idle mode associated with different levels of activity with respect to the first radio and the second radio, and wherein the traffic load is determined to be level when the first capacity difference and the second capacity difference are nearly equal.

16. The non-transitory machine-readable storage medium of claim 15, wherein the operations further comprise:
determining that the traffic load between the first radio and the second radio is not nearly equal; and
changing the first parameter or a second parameter to level the traffic load between the first radio and the second radio.

17. The non-transitory machine-readable storage medium of claim 15, wherein the operations further comprise:
estimating a network traffic overlap between the sector and an adjacent sector; and
re-routing network traffic from the sector to the adjacent sector, wherein a first traffic load of the sector is heavier than a second traffic load of the adjacent sector.

18. The system of claim 1, wherein the respective operation modes further comprise an access mode.

19. The system of claim 1, wherein the operations further comprise:
adjusting an offset value representing an offset to bias the distributing the portion of the resource to the second radio based on an energy per chip-to-total noise.

20. The non-transitory machine-readable storage medium of claim 15, wherein the operations further comprise:
adjusting an offset value representing an offset to bias the causing the defined portion of the network traffic load to move from the first radio to the second radio based on an interference power spectral density of a decibel level.

* * * * *